W. GARDINER.
BATTERY.
APPLICATION FILED FEB. 17, 1909.
938,312.
Patented Oct. 26, 1909.
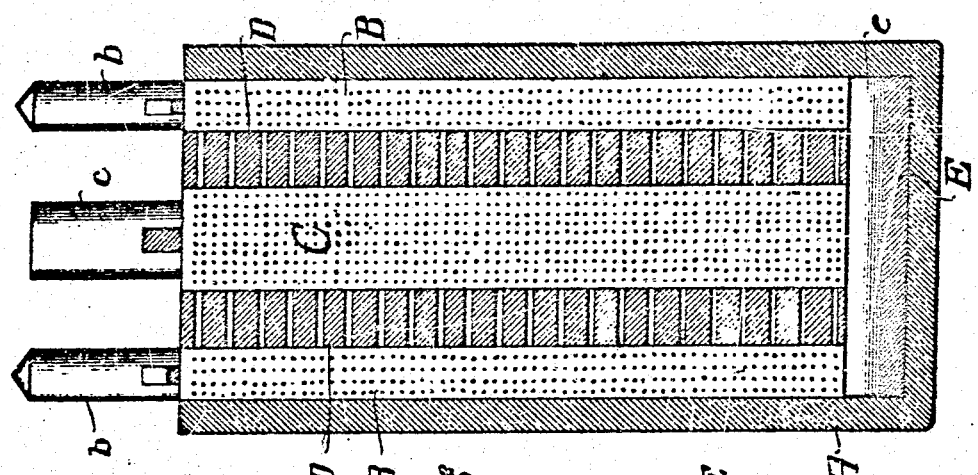
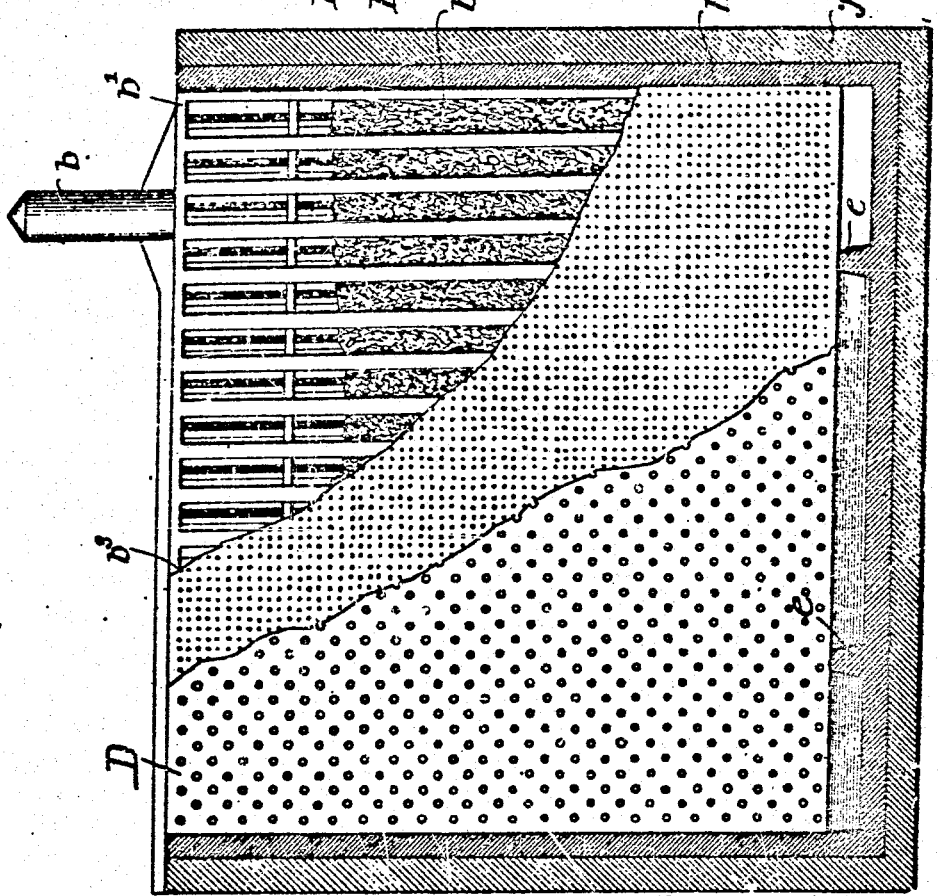
Witnesses:
Ralph A. Schaefer
William T. Jones
Inventor,
William Gardiner,
By Dyrenforth, Lee, Chritton & Wiles
Att'ys

UNITED STATES PATENT OFFICE.

WILLIAM GARDINER, OF CHICAGO, ILLINOIS, ASSIGNOR TO AJAX BATTERY COMPANY, OF CHICAGO, ILLINOIS, A CORPORATION OF ILLINOIS.

BATTERY.

938,312.        Specification of Letters Patent.        Patented Oct. 26, 1909.

Application filed February 17, 1908. Serial No. 416,265.

*To all whom it may concern:*

Be it known that I, WILLIAM GARDINER, a citizen of the United States, residing at Chicago, in the county of Cook and State of Illinois, have invented a new and useful Improvement in Batteries, of which the following is a specification.

My invention relates particularly to secondary batteries, or storage batteries; and my primary object is to provide a battery of this character, which, for a given weight, is capable of developing for a long continued period an electric current of well sustained electromotive force, the battery being at the same time very durable and of great longevity and capable of being manufactured at a reasonable cost.

The invention is illustrated in its preferred embodiment in the accompanying drawing, in which—

Figure 1 represents a longitudinal vertical section of a battery constructed in accordance with my invention, certain of the internal parts being shown brokenly; and Fig. 2, a transverse vertical section of the same.

In the illustration given, A represents a cell or vessel preferably composed of lead containing a sufficient amount of antimony to give the desired strength; B, B, negative plates, or cathodes, inserted adjacent to the sides of the cell and contacting therewith and equipped with terminals $b$; C, a centrally located positive plate, or anode, provided with a terminal $c$; and D, D, perforate insulating plates confined between the positive plate C and the negative plates B, B. Before the plates are inserted, there is inserted into the cell a U-shaped piece of rubber E, the web of which lies upon the bottom of the cell and the vertical members of which cover the inner faces of the ends of the cell. The web of the member E is equipped with transverse ribs $e$ on which the plates rest, thus providing room for any sediment which may collect at the bottom of the cell.

Each of the cathodes B comprises a grid or skeleton plate $b^1$, preferably composed of lead containing sufficient antimony to lend stiffness thereto; a plastic composition or paste $b^2$ filling the interstices of the grid and comprising materials hereinafter set forth; and an envelop $b^3$ composed of perforate sheet lead and which covers the sides of the grid and aids in retaining the composition within the structure of the grid. The positive plate, or anode, C is structurally similar to the cathodes, but is thicker and has a different composition of matter within its structure than is used in the cathodes. Any suitable electrolyte, such as sulfate of magnesia, or sulfuric acid may be employed. In each of the positive and negative pole compounds employed, I employ molybdenum or compounds thereof, such as molybdic anhydrid ($MoO_3$), or molybdenite, that is the sulfuret of molybdenum.

The composition of matter which forms a part of the positive plate or anode is preferably as follows: molybdic anhydrid ($MoO_3$) 2 lbs., red lead ($Pb_3O_4$) 50 lbs., litharge (popularly known as glass-makers' litharge) $PbO$, 48 lbs., mixed in paste with solution of sulfate of magnesia, hydrometer test 1000 (about 5 gallons).

The composition for the negative plates, or cathodes, is preferably as follows: lampblack (powdered coke) 2 lbs., molybdic anhydrid ($MoO_3$) 2 lbs., litharge ($PbO$), 60 lbs. Red lead ($Pb_3O_4$) 36 lbs., bisulfid of mercury ($HgS_2$) 5 ounces. Use same solution as above to mix in paste, first dissolving the bisulfid of mercury in the solution.

Sulfuric acid may be employed in lieu of the solution of sulfate of magnesia for mixing purposes, and may also be employed in the electrolyte when the battery is in operation. Solution of sulfate of magnesia is preferably employed as an electrolyte, however. Other compounds of molybdenum, for instance, molybdenite, or the sulfuret of molybdenum, may be employed in lieu of the molybdic anhydrid, though it is believed with not quite so good results. The proportions, of course, may be varied; and, while the use of the compounds as above set forth is recommended, some of the ingredients may be omitted or replaced by other ingredients.

Experience has demonstrated that my improved battery will operate, after charging, to furnish a much greater amount of electrical energy than can be obtained from the storage batteries commonly on the market and known to me. Moreover, the battery will operate continuously for a long period with a well sustained electromotive force, is very durable, can be manufactured at a moderate cost, and is capable of being recharged a large number of times with very little depreciation.

The foregoing detailed description has been given for clearness of understanding only, and no undue limitation is to be understood therefrom.

It may be stated that the red lead ($Pb_3O_4$) referred to above, which forms the largest constituent of the paste, is commercially known as red lead. It is of about the consistency of flour and of reddish or orange color. The litharge referred to, which is commercially so known, is of a yellowish color and of about the consistency of flour. It is understood to be more correctly known as massicot. The glass-makers' litharge, so known commercially, because largely employed by glass-makers, is of a bright copper color and granular in form, the small crystals being like small grains of sand, but of a reddish tint, modified by a yellowish shade, and closely approaching the color of bright copper. It is not known that the chemical symbols for these two latter materials differ. Possibly there are varying amounts of oxygen present, and the mechanical state differs. The glass-makers' litharge (probably properly designated simply litharge) contributes a certain desirable hardness and porosity to the plate, contributing to the standing up qualities of the active materials. The more pulverulent oxids take more ready part in the electrolytic action of the battery. The molybdic anhydrid contributes to the longevity of the battery and to the standing up qualities of the active mass. It is quite expensive, and while preferably employed in about the proportion set forth, where the item of expense may be disregarded, an extensive series of tests have demonstrated that the proportions may be varied through a wide range without loss of good results. It is understood that the proportions of glass-makers' litharge (litharge) and popularly so-called, litharge (massicot) may be used in both plate compositions in varying proportions.

What I regard as new, and desire to secure by Letters Patent, is—

1. A secondary battery having an anode with a composition containing molybdenum forming a part thereof, in combination with a cathode.

2. A secondary battery having a cathode formed with a composition containing molybdenum, in combination with an anode.

3. A secondary battery provided with an anode containing molybdenum, in combination with a cathode containing molybdenum.

4. A secondary battery comprising an anode, in combination with a cathode having a composition of a compound of molybdenum associated with a compound of lead.

5. A secondary battery comprising a cathode in combination with an anode having a composition of molybdenum in association with a compound of lead.

6. A secondary battery comprising an anode in combination with a cathode having a composition of matter whose ingredients include a compound of molybdenum, a compound of lead and a compound of mercury.

7. A secondary battery comprising a cathode in combination with an anode having a combination of matter including as ingredients a compound of molybdenum, a compound of lead, and a compound of sulfur.

8. A secondary battery having an anode formed with a composition containing molybdic anhydrid ($MoO_3$) in combination with a cathode.

9. A secondary battery having a cathode formed with a composition containing molybdic anhydrid ($MoO_3$), in combination with an anode.

10. A secondary battery having an anode formed with a composition containing molybdic anhydrid ($MoO_3$), and lead oxid (PbO), in combination with a cathode.

11. A secondary battery having a cathode formed with a composition containing molybdic anhydrid ($MoO_3$), lead oxid (PbO) and bisulfid of mercury ($HgS_2$).

12. A secondary battery having a cathode formed with a composition containing carbon, a compound of molybdenum, a compound of lead and a compound of mercury, in combination with an anode.

13. A secondary battery having an anode formed with a composition containing molybdic anhydrid ($MoO_3$), and glass-makers' litharge, in combination with a cathode containing molybdic anhydrid, glass-makers' litharge and a compound of mercury.

WILLIAM GARDINER.

In presence of—
RALPH SCHAEFER,
K. M. CORNWALL.